Sept. 25, 1956   R. Q. ARMINGTON   2,764,207
TIRE TRACK WITH ELASTIC TIRE
Filed Oct. 27, 1952   2 Sheets-Sheet 2

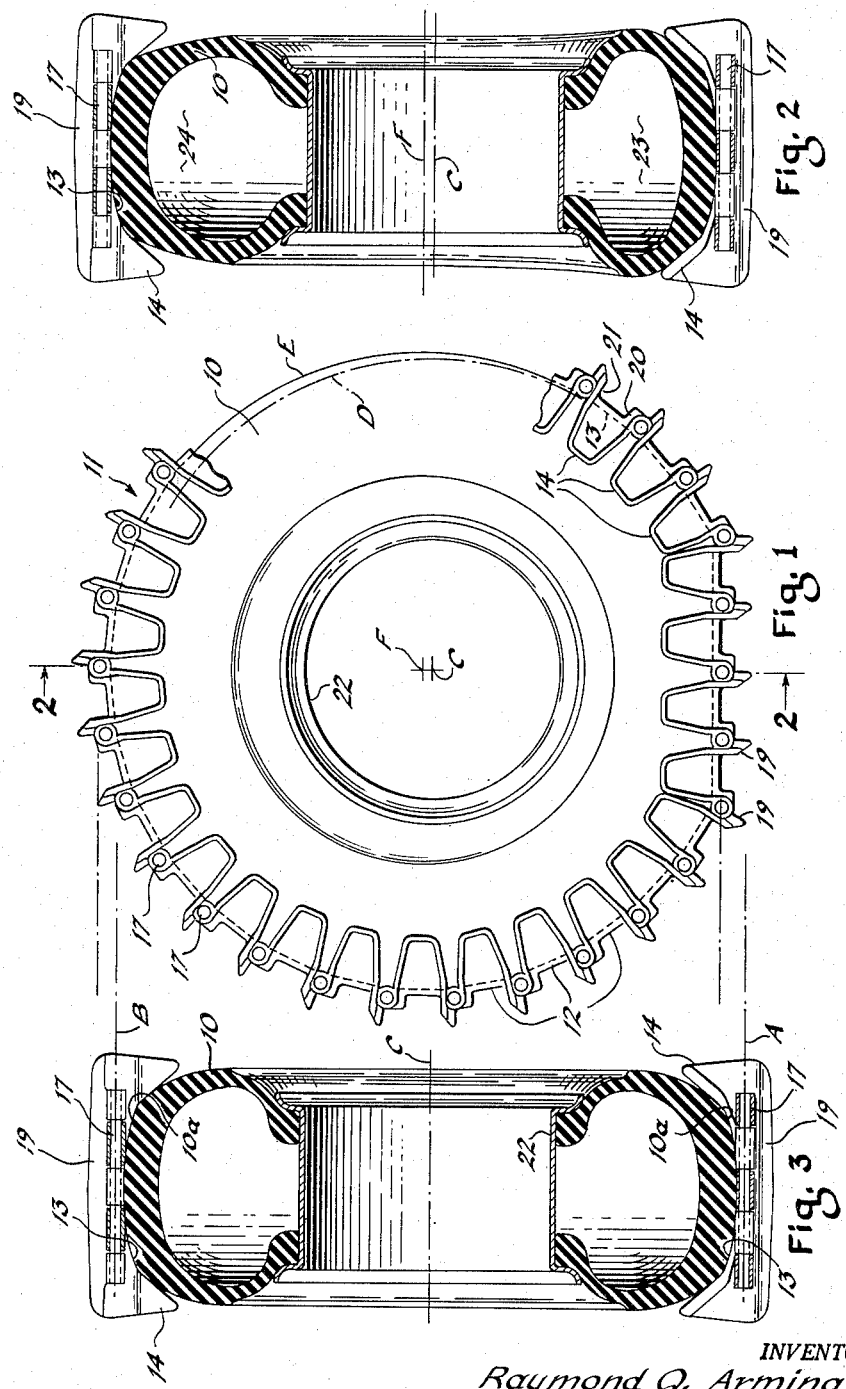

INVENTOR.
Raymond Q. Armington
BY
Hyde, Meyer, Baldwin & Doran
ATTORNEYS

United States Patent Office 2,764,207
Patented Sept. 25, 1956

2,764,207

TIRE TRACK WITH ELASTIC TIRE

Raymond Q. Armington, Shaker Heights, Ohio, assignor, by mesne assignments, to General Motors Corporation, Detroit, Mich., a corporation of Delaware Application October 27, 1952, Serial No. 317,024

3 Claims. (Cl. 152—182)

This invention relates to improvements in a combination of a pneumatic tire having a tread stretchable circumferentially when inflated and an endless track comprising a plurality of rigid shoes with articulating connections between them, the track completely surrounding and engaging the circumference of the tire.

An object of the present invention is to provide a novel arrangement whereby a large diameter, low-pressure pneumatic tire is combined with an endless track composed of steel shoes to protect the tire and to provide additional grip between the tire and the ground when driving large vehicles off the highway.

One of the problems encountered in utilizing such a combination of an endless track composed of rigid shoes surrounding a pneumatic tire is that the shoes are difficult to retain tight against the tire at all times, so that there is often a tendency for the tire to creep inside of the track. It is also important in this type of combination that the track should not loosen or lay down on the ground ahead of the point at which the tire contacts the ground. This occurs when using conventional tires surrounded by a track of the type described due to a combination of the drive torque and the deflection of the tires under load. The flattening of the tire on the ground under loaded contact reduces the overall circumference of the conventional tire causing the tire to loosen inside of the track. It has also been found difficult to assemble a tire track of this sort on a conventional tire so that it is sufficiently tight to prevent the loosening just mentioned. It is an object of the present invention to solve these problems.

Other objects and advantages of the present invention will be disclosed in the accompanying drawings, described in the specification, and the essential features thereof will be set forth in the appended claims.

In the drawings,

Fig. 1 is a side elevation view of a tire equipped with my track, the tire being shown in its loaded condition;

Fig. 2 is a central sectional view taken along the line 2—2 of Fig. 1;

Fig. 3 is a view similar to Fig. 2 but taken with the track assembled on the tire and the entire combination in unloaded condition;

Fig. 6 is a fragmental sectional view taken along the line 6—6 of Fig. 4; while

While my invention is applicable to any large diameter tire designed for vehicles utilized largely in off-the-highway use, such as earth digging and hauling equipment, I have chosen to illustrate the same as applied to an 18.00 x 25 tire designed to operate with an inflation pressure preferably not over 25 pounds per square inch. This permits a large flat area on the ground with consequent driving friction which is necessary for these large and heavily loaded vehicles.

The tire 10 shown in the various views illustrates a casing only although it will be understood that such tires conventionally use inner tubes also. The tire 10 is a specially made tire having a tread which is stretchable circumferentially when inflated. By the use of the term stretchable circumferentially in the specification and claims of this application, I define a tire which has appreciably greater stretchable qualities in its tread, as mentioned circumferentially, as compared with a conventional tire in use today. The side walls of the tire 10 are of strong side wall construction the same as found in conventional tires today.

Figure 4:
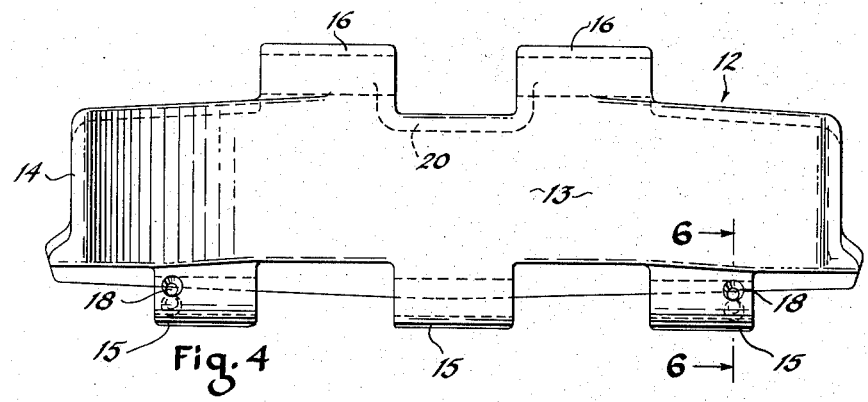
Fig. 4 is a top plan view of one of the shoes of the track shown in Figs. 1, 2, and 3.
Figure 5:
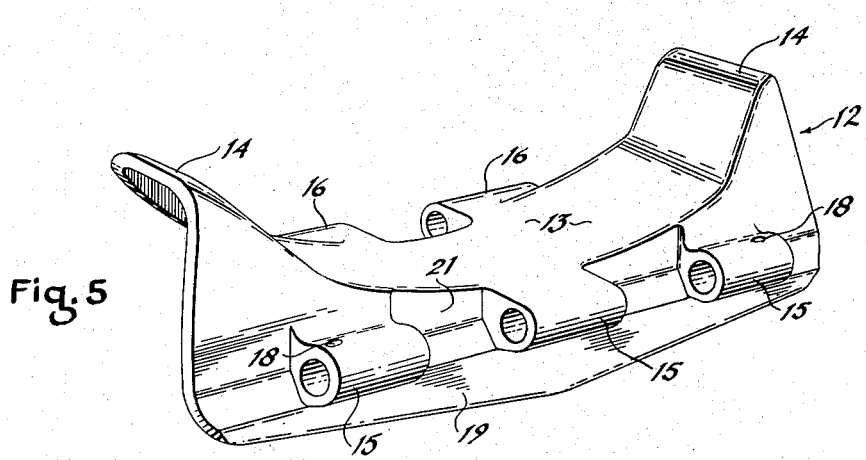
Fig. 5 is a perspective view of one of the shoes of the track.

The endless track 11 is comprised of a plurality of rigid shoes 12 as shown in Figs. 4 and 5. These shoes are preferably made of steel.

Each track shoe has a central smooth tire engaging portion 13 which is slightly concave inwardly toward the tire, such concavity being laterally across the tire. The laterally outermost end of each shoe is bent upwardly as indicated at 14 so as to extend partially around the tire and to prevent the track sliding off the tire side ways. Hinge pin bosses 15 and 16 are provided on the oppositely extending circumferential faces of the shoe, there being three of the hinge pin bosses 15 and two of the bosses 16, these bosses of course being so arranged that the bosses 16 of one shoe fit rather snugly between the bosses 15 of the next adjacent shoe. Hinge pins 17 are then utilized to connect the interfitting bosses of two adjacent shoes so as to form an endless articulated track. In the laterally outermost hinge pin lugs 15 there are provided diametrically opposite holes 18 and retaining pins pass through these openings 18, so as to maintain the hinge pins in their proper places holding the track together.

A grouser 19 extends radially outwardly from each shoe beyond the hinge pin lugs 15 so as to dig into the ground and provide good traction when the shoe and track are driving a vehicle.

The shoe 12 is very light in weight and comprises metal generally of uniform thickness, generally of U-shape as cut circumferentially across the shoe. Referring to Figs. 4 and 5, the shoe is generally U-shape in section, the bottom of the U being upwardly and forming the portion 13 of the shoe, while one leg of the U-shape extends downwardly at 20 to support the hinge lug 16. The other leg of the U-shape extends downwardly as indicated at 21 and supports the hinge lug 15. The grouser 19 is essentially an extension of the leg 21.

The track 11 is assembled on the tire 10 when the tire is either deflated or only partially inflated. When the tire is inflated to its working pressure, say about 25 pounds per square inch, then the track is frictionally held on the tire by the tight engagement between the tread portion of the tire at 10a and the portion 13 of the individual shoes. This condition is illustrated in Fig. 3. At this time the center line A of the hinge pins 17 at the bottom of the tire and the center line B of the hinge pins at the top of the tire are equidistant from the center line of axis of the wheel drum 22. The tread of the tire snugly engages the portion 13 of each shoe clear out to where the wing portions 14 begin to diverge away from the portion 13.

When the assembled tire and track are under load as shown in Figs. 1 and 2, the bottom portion flattens out against the ground and the grousers 19 dig into the ground to give better traction. Looking at Fig. 2, it will be noted that the cross sectional area at 23 is much less than the similar area at the bottom of Fig. 3 where the tire was in unloaded condition. The air displaced from the chamber portion 23 is forced to the sides and top of the tire as indicated at the portion 24 at the top of Fig. 2. Since the tread portion 10a is stretchable, the circumference of all but the ground engaging portion of the tire is increased from the dot-dash line D of Fig. 7 to the full line E shown there. These same lines are shown in part on Fig. 1. At this time, the center of the tire shifts from the point C of Fig. 1 to the point F slightly above C. The center of the wheel drum 22 remains at C. This stretching of the tread portion of the tire from line D to line E causes the tire to tightly engage the inner-portion of the track 11 where otherwise there would be a loosening of the track on the tire if a conventional tire were used in place of the stretchable tire 10. Obviously, the bottom portion of the tire in its loaded condition as shown in Fig. 2 hugs the wing portions 14 of the ground engaging shoes, while at the top of the tire, the side walls of the tire are somewhat further removed from the wings 14 at that location than at the similar location at the top of Fig. 3.

Figure 7:
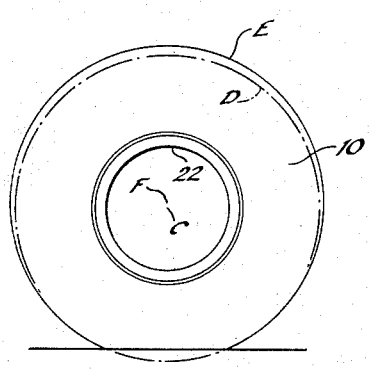
Fig. 7 is a diagrammatic view showing the relationship between the circumference of the tire loaded and unloaded.
Figure 6:
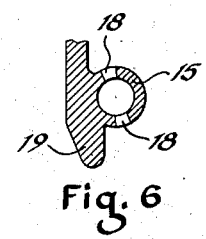

In the actual 18.00 x 25 tire described, the difference in the radii of the lines D and E of Figs. 1 and 7 is about three inches. It is this expansion of the free portion of the tire which keeps the track tight on the tire.

It will be noted that there are no interengaged projections between the inside of the shoes and the outer tread of the tire and the only driving engagement between the tire and the track is the friction of the tire against the track. In actual tests, it has been shown that my invention keeps the track tight enough on the tire to prevent the tire slipping or creeping inside of the track. The track does not loosen or lay down on the ground ahead of the point at which the tire contacts the ground but the inner-surfaces 13 of all of the track shoes at all times snugly engage the outer-surface of the tread portion 10a of the tire 10.

What I claim is:

1. In combination, a pneumatic tire having a smooth tread stretchable circumferentially when inflated, an endless track completely surrounding and engaging the circumference of said tire, said track comprising a plurality of rigid shoes and articulating connections between adjacent shoes, said shoes having end portions partially embracing the side walls of the tire said tire having an appreciably greater peripheral diameter when inflated to working pressure as compared to a partially deflated condition, and said track having an effective tire engaging circumference equal to that of said tire in partially deflated condition, whereby said tire when inflated to working pressure frictionally engages and grips said track entirely around the periphery of said tire; and said tire, when flattened at the bottom under load, causes stretching of the non-ground-engaging portions of said tire to resiliently hold said tire and track in engagement at all points around said tire.

2. In combination, a pneumatic tire having a tread stretchable circumferentially when inflated, an endless track completely surrounding and engaging the circumference of said tire, said track comprising a plurality of rigid shoes and articulating connections between adjacent shoes, said shoes having end portions partially embracing the side walls of the tire said tire having a predetermined peripheral diameter when inflated to working pressure of approximately twenty-five pounds per square inch as compared to a partially deflated condition, and said track having an effective tire engaging circumference equal to that of said tire in partially deflated condition, whereby said tire when inflated to working pressure frictionally engages and grips said track entirely around the periphery of said tire; and said tire, when flattened at the bottom under load, causes stretching of the non-ground-engaging portions of said tire to resiliently hold said tire and track in engagement at all points around said tire.

3. In combination, a pneumatic tire having a smooth tread stretchable circumferentially when inflated, an endless track completely surrounding and engaging the circumference of said tire, said track comprisng a plurality of one piece rigid shoes and articulating connections between adjacent shoes, said shoes having end portions partially engaging the side walls of the tire, said tire having an appreciably greater peripheral diameter when inflated to working pressure as compared to a partially deflated condition, and said track having an effective tire engaging circumference equal to that of said tire in partially deflated condition, whereby said tire when inflated to working pressure frictionally engages and grips said track entirely around the periphery of said tire; and said tire, when flattened at the bottom under load, causing stretching of the non-ground-engaging portions of said tire to resiliently hold said tire and track in engagement at all points around said tire.

References Cited in the file of this patent

UNITED STATES PATENTS

| | | |
|---|---|---|
| 1,307,036 | Bretscher | June 17, 1919 |
| 1,539,721 | Davis | May 26, 1925 |
| 1,629,517 | Marshall | May 24, 1927 |
| 1,827,668 | Musselman | Oct. 13, 1931 |
| 2,046,299 | Armington | June 30, 1936 |
| 2,294,772 | Cook | Sept. 1, 1942 |